United States Patent
Böhm (10) Patent No.: US 10,081,344 B2
(45) Date of Patent: Sep. 25, 2018

(54) METHOD FOR CONTROLLING AN ELECTROMECHANICAL ACTUATOR, AND CONTROL DEVICE

(71) Applicant: Continental Teves AG & Co. oHG, Frankfurt (DE)

(72) Inventor: Jürgen Böhm, Oberneisen (DE)

(73) Assignee: CONTINENTAL TEVES AG & CO., OHG, Frankfurt (DE)

(*) Notice: Subject to any disclaimer, the term of this patent is extended or adjusted under 35 U.S.C. 154(b) by 74 days.

(21) Appl. No.: 14/896,290

(22) PCT Filed: May 13, 2014

(86) PCT No.: PCT/EP2014/059688
§ 371 (c)(1),
(2) Date: Dec. 4, 2015

(87) PCT Pub. No.: WO2014/195093
PCT Pub. Date: Dec. 11, 2014

(65) Prior Publication Data
US 2016/0137178 A1  May 19, 2016

(30) Foreign Application Priority Data

Jun. 5, 2013 (DE) .................. 10 2013 210 422
Dec. 5, 2013 (DE) .................. 10 2013 224 967

(51) Int. Cl.
*B60T 8/32* (2006.01)
*B60T 8/40* (2006.01)
*H01F 7/06* (2006.01)

(52) U.S. Cl.
CPC ............ *B60T 8/326* (2013.01); *B60T 8/4081* (2013.01); *H01F 7/064* (2013.01); *B60T 2270/82* (2013.01)

(58) Field of Classification Search
None
See application file for complete search history.

(56) References Cited

U.S. PATENT DOCUMENTS

| | | | | |
|---|---|---|---|---|
| 5,480,221 A | * | 1/1996 | Morita | ................ B60T 8/172 303/113.5 |
| 2013/0080017 A1 | * | 3/2013 | Bohm | .............. B60T 7/042 701/78 |

FOREIGN PATENT DOCUMENTS

| | | |
|---|---|---|
| DE | 10 2009 054 985 A1 | 1/2011 |
| DE | 10 2012 200 494 A1 | 8/2012 |

(Continued)

OTHER PUBLICATIONS

German Examination Report—dated Sep. 17, 2014.

*Primary Examiner* — Nicholas K Wiltey
(74) *Attorney, Agent, or Firm* — Brinks Gilson & Lione (57) ABSTRACT

A method and control system for controlling an electromechanical actuator (1, 2) of a brake system for motor vehicles, in which a measured actual value, of a controlled variable is intended to be set to a specified target value. A first actuator speed target value is determined on the basis of the target value and the actual value by a first controller (19,20), and wherein a manipulated variable for the electromechanical actuator (I, 2) is determined on the basis of the first actuator speed target value and a second actuator speed target value. The second actuator speed target value is determined on the basis of the target value and a specified relationship (30, 40) between the controlled variable and a variable corresponding to a position of the electromechanical actuator.

14 Claims, 4 Drawing Sheets

(56) References Cited

FOREIGN PATENT DOCUMENTS

| EP | 1 611 365 B1 | 8/2007 |
|---|---|---|
| WO | WO 2008/025797 A1 | 3/2008 |
| WO | WO 2011/154275 A1 | 12/2011 |
| WO | WO 2011/154369 A1 | 12/2011 |

* cited by examiner

METHOD FOR CONTROLLING AN ELECTROMECHANICAL ACTUATOR, AND CONTROL DEVICE

CROSS REFERENCE TO RELATED APPLICATIONS

This application claims priority to German Patent Application Nos. 10 2013 210 422.7, filed Jun. 5, 2013; 10 2013 224 967.5, filed Dec. 5, 2013; and PCT/EP2014/059688, filed May 13, 2014.

FIELD OF THE INVENTION

The invention relates to a method for controlling an electromechanical actuator of a brake system for motor vehicles and to a related control.

BACKGROUND

"Brake-by-wire" brake systems are becoming increasingly widespread in automotive engineering. In addition to a main brake cylinder, which is actuatable by the vehicle driver, hydraulic "brake-by-wire" brake systems often includes an electrically controllable pressure supply device, by which, in the "brake-by-wire" operating mode, the wheel brakes are actuated either directly or via the main brake cylinder. In order to impart a pleasant and expected pedal sensation to the vehicle driver in the "brake-by-wire" operating mode, the brake systems usually includes a brake pedal sensation simulation device, which is operatively connected, for example, to the main brake cylinder. A setpoint value generator is provided to control the brake system, which setpoint value generator, for example, evaluates the electrical signals of one or more sensors for sensing the driver's braking command (actuation command) in order to determine a setpoint value for controlling the pressure supply device. In these brake systems, the pressure supply device can also be actuated, however, on the basis of electronic signals without active input from the driver. These electronic signals can be output, for example, by an electronic stability program (ESC) or distance control system (ACC), and so the setpoint value generator determines a setpoint value for controlling the pressure supply device on the basis of these signals.

A method for controlling an electrohydraulic brake system for motor vehicles having an electronically controllable pressure supply device which is connected to hydraulically actuatable wheel brakes, is described in WO 2011/154275 A1. The pressure supply device includes a cylinder-piston assembly having a hydraulic pressure chamber, the piston of which can be displaced relative to a rest position by an electromechanical actuator. For the purpose of control, a pre-pressure actual value and a pre-pressure setpoint value are determined, which are fed, as input variables, to a control device. The cylinder-piston assembly is controlled by the control device in such a way that the pre-pressure setpoint value in the hydraulic pressure chamber is set via displacement of the piston.

In addition, "brake-by-wire" brake systems having at least one electromechanically actuatable wheel brake are known. For example, EP 1 611 365 B1 discloses an actuating unit for an electromechanically actuatable disk brake for motor vehicles, which is disposed on a brake caliper, in which two friction linings, each of which interacts with a lateral surface of a brake disk, are disposed so as to have limited displaceability, wherein one of the friction linings can be brought into engagement with the brake disk directly by the actuating unit by means of an actuating element and the other friction lining can be brought into engagement with the brake disk by means of the effect of a reaction force applied by the brake caliper, wherein the actuating unit consists of an electric motor, a first reduction gear operatively disposed between the electric motor and the actuating element, and a second reduction gear disposed between the electric motor and a part of the first reduction gear, and wherein assigned to the actuating unit is an electronic control unit, which is used to control the electric motor.

A method for controlling a brake system having a hydraulic cylinder-piston assembly, as the pressure supply device, which can be driven by an electromechanical actuator is described in DE 10 2012 200 494 A1. In this case, a manipulated variable for the electromechanical actuator is determined as a function of a measured pressure actual value and a specified pressure setpoint value. If certain conditions are present, instead of the measured pressure actual value, a calculated model pressure actual value is determined and the manipulated variable for the electromechanical actuator is determined on the basis of the model pressure actual value and the specified pressure setpoint value. In this case, the model pressure actual value is calculated according to a specified linear function from the present position of the pressure supply device. The specified linear function is therefore used to calculate an alternative pressure actual value for the control, instead of the measured pressure actual value. The method is used exclusively for quickly bridging, in particular great, clearance of the wheel brake(s) connected to the pressure supply device. A general improvement of the accuracy of the closed-loop response is therefore not achieved.

A problem addressed by the present invention is that of providing a method for controlling an electromechanical actuator, and a control device for an electromechanical actuator, which enables a more precise setting of specified setpoint values of a controlled variable or (time) setpoint value curves.

This problem is solved according to the invention by a method and by a control device described herein.

SUMMARY AND INTRODUCTORY DESCRIPTION OF THE INVENTION

The invention is based on the concept of determining a first actuator speed setpoint value on the basis of the setpoint value and the actual value of the controlled variable, determining a second actuator speed setpoint value on the basis of the setpoint value of the controlled variable and a specified relationship between the controlled variable and a variable corresponding to a position of the electromechanical actuator, and determining the manipulated variable for the electromechanical actuator on the basis of the first and the second actuator speed setpoint value. The second actuator speed setpoint value therefore represents an improved speed precontrol.

The invention offers the advantage that the setpoint values are set in a manner that is adapted to the situation and, therefore, is faster and more precise.

According to the invention, an actuator position is generally understood to be a position of the electromechanical actuator or a part of the electromechanical actuator or a position of a component driven by the electromechanical actuator. For example, the actuator position can be a rotor orientation angle of an electric motor or a spindle position of a rotation-translation gearbox. In the case of a piston of a pressure supply device driven by the electromechanical actuator, the actuator position can be, for example, a position of the piston.

According to the invention, a variable corresponding to a position of the electromechanical actuator is understood to be a variable, which is unambiguously correlated to an actuator position. The variable corresponding to a position of the electromechanical actuator can be the actuator position itself or a variable linked thereto. In the case of a cylinder-piston assembly driven by the electromechanical actuator, the corresponding variable can be, for example, the volume of the pressure chamber of the pressure supply device, which is unambiguously linked to the actuator position (or piston position) via the diameter of the cylinder. In the mentioned case, the specified relationship between the controlled variable and the variable corresponding to a position of the electromechanical actuator can be given, for example, by a pressure-piston position characteristic curve or a pressure-volume characteristic curve or a pressure-rotor orientation angle characteristic curve.

The first actuator speed setpoint value is preferably determined by means of a first controller from the setpoint value and the actual value.

According to a refinement of the invention, a third actuator speed setpoint value is determined on the basis of the first and the second actuator speed setpoint value. This is advantageously fed, as an input variable, to a second controller. The second controller is particularly preferably a speed controller. The third actuator speed setpoint value is particularly preferably formed, for simplicity's sake, via addition of the first and the second actuator speed setpoint value.

The second controller preferably delivers, as the output variable, a torque setpoint value as the manipulated variable for the electromechanical actuator.

According to a preferred embodiment of the method according to the invention, an actuator position setpoint value is determined from the setpoint value by means of the specified relationship.

In addition, the second actuator speed setpoint value is preferably determined from the actuator position setpoint value. With this it is then possible to carry out a speed precontrol.

In order to improve the quality of the determined actuator position setpoint value, the setpoint value is preferably filtered and the filtered setpoint value is used to determine the actuator position setpoint value.

Preferably, an increase limitation of the determined actuator position setpoint value is carried out. Particularly preferably, to this end, a change in the actuator position setpoint value is limited to a maximum change in position per one sampling step of the first controller.

Preferably, a first actuator speed is determined on the basis of the limited actuator position setpoint value or on the basis of the limited change in the actuator position setpoint value. The first actuator speed can be easily determined by differentiation of the limited actuator position setpoint value. The first actuator speed can likewise be easily determined from the limited changes in the actuator position setpoint value, since the sampling points of the controller loop are known.

In order to adapt the control, a weighting of the speed precontrol is preferably carried out by weighting the first actuator speed via multiplication with a scaling factor.

According to a preferred refinement of the invention, a speed limitation of the first actuator speed is carried out. This is advantageously carried out as a function of the direction of rotation of the actuator, and so, for the case of a pressure/force build-up, large values for the speed precontrol can be permitted, for example, in order to support the rapid bridging of the clearance, whereas smaller values are sufficient for a pressure/force reduction.

The second actuator speed setpoint value is preferably determined on the basis of the limited actuator position setpoint value or the limited change in the actuator position setpoint value or the first actuator speed.

The invention also relates to a control device.

The control device preferably is configured to carry out a method according to the invention.

According to a preferred embodiment of the control device according to the invention, the first controller outputs the first actuator speed setpoint value, and the third actuator speed setpoint value and an actuator speed actual value are fed, as input variables, to the second controller.

The second controller preferably outputs an actuator torque setpoint value, from which a second actuator torque setpoint value for controlling the actuator is determined. The second actuator torque setpoint value is determined, particularly preferably, with consideration for specified minimum and maximum torque limit values.

The control device preferably includes a means for calculating an actuator position setpoint value from the setpoint value by means of the specified relationship. In this case, particularly preferably, the setpoint value is filtered by means of a filter before the setpoint value is used for calculating the actuator position setpoint value. This is advantageously a low-pass filter.

It is likewise preferable that a means for determining the second actuator speed setpoint value from the actuator position setpoint value is provided.

Preferably, a means for the increase limitation of the determined actuator position setpoint value is provided. Particularly preferably, a means for limiting a change in the actuator position setpoint value to a maximum change in position per sampling step or sampling time is provided.

Furthermore, a means calculating a first actuator speed from the limited actuator position setpoint value or from the limited change in the actuator position setpoint value in the control device according to the invention is preferably provided.

In addition, according to a refinement of the control device according to the invention, a means for multiplying the first actuator speed by a scaling factor and/or a means for limiting the first actuator speed is provided.

The method according to the invention or the control device according to the invention is preferably used to control an electromechanical actuator of an electromechanically actuatable wheel brake.

Alternatively, it is preferable to use the method according to the invention or the control device according to the invention for controlling an electromechanical actuator of a brake system having at least one hydraulically actuatable wheel brake. Particularly preferably, the method according to the invention or the control device according to the invention is used for controlling an electromechanical actuator of a pressure supply device. Advantageously, this is a pressure supply device includes a cylinder-piston assembly having a hydraulic pressure chamber, the piston of which can be displaced by the electromechanical actuator.

Preferably, an electrically controllable inlet valve is disposed between one, in particular each wheel brake and the associated pressure chamber, by means of which inlet valve the wheel brake can be hydraulically separated from the pressure chamber.

Preferably one, in particular each wheel brake can be connected to a pressure medium reservoir via an electrically controllable outlet valve.

BRIEF DESCRIPTION OF THE DRAWINGS

Further preferred embodiments of the invention shall become apparent from the description with reference to figures.

Schematically in the drawings.

CONTINUED DESCRIPTION OF THE INVENTION

Figure 1:
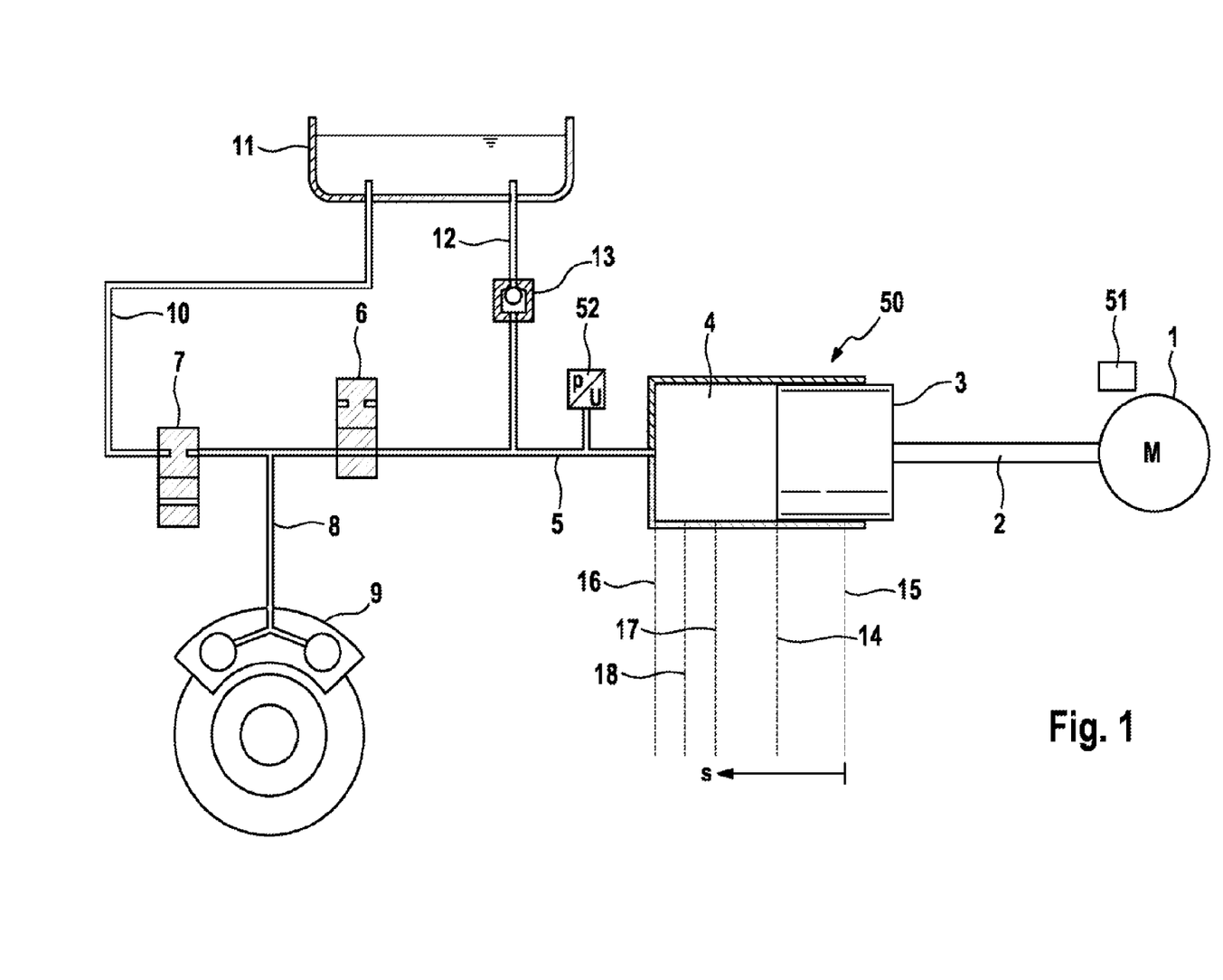
FIG. 1 shows a simplified diagram of an electrohydraulic brake system for carrying out a method according to the invention.

A simplified diagram of an exemplary hydraulic brake system for motor vehicles for carrying out a method according to the invention is schematically illustrated in FIG. 1. The brake system includes a non-illustrated brake pedal and an electronically controllable pressure supply device 50, by means of which pressure for actuating at least one hydraulically actuatable wheel brake 9 can be generated. The actuation of the brake pedal or the driver's braking command is detected, for example, by means of a suitable sensor, and the pressure supply device 50 is electronically controlled according to the detected actuation. By way of example, the pressure supply device 50 is formed by a cylinder-piston assembly having a hydraulic pressure chamber 4 and a plunger piston 3. The plunger piston 3 can be displaced by means of an electromechanical actuator, for example, an electric motor 1 having a suitable gearbox 2, and so a pressure can be set in the hydraulic pressure chamber 4. The gearbox 2 is advantageously designed as a rotation-translation gearbox, for example, a ball screw drive. The wheel brake 9 is preferably hydraulically connectable or connected to the pressure chamber 4 of the pressure supply device 50 via a line 8, 5. Alternatively, it is conceivable that the wheel brake(s) is/are hydraulically connectable or connected to an (output) pressure chamber of a main brake cylinder or a dividing piston assembly via a line, wherein a piston of the main brake cylinder or the dividing piston assembly can be actuated by the pressure supply device via an (input) pressure chamber/intermediate chamber (not illustrated, see, for example, WO 2008/025797 A1 or DE 10 2009 054 985.4 which are hereby incorporated by reference). In any case, a pressure demand $P_{Sys,Target}$ (for example, from the driver or a brake control function or a driver assistance system) is electronically converted, with the aid of the electronically controllable pressure supply device 50, into a system pressure $P_{Sys}$ for acting upon the wheel brake or usually the wheel brakes 9. The wheel brake(s) 9 can be hydraulically connected to the pressure chamber 4 of the pressure supply device 50 via a line in order to achieve a rapid and precise pressure setting at the wheel brake or the wheel brakes 9.

In addition, the exemplary brake system in FIG. 1 includes an inlet valve 6 and an outlet valve 7 disposed in the line 5 for modulating brake pressure at the wheel brake 9, wherein the wheel brake 9 can be connected to a pressure medium reservoir 11 via the outlet valve 7 in the event of a setpoint reduction in wheel brake pressure. The pressure chamber 4 of the pressure supply device 50 is connected to the pressure medium reservoir 11 for feeding pressure medium from the pressure medium reservoir 11 into the pressure chamber 4 via a connecting line 12 to a non-return valve 13 closing in the direction of the pressure medium reservoir 11.

During braking, the piston 3 of the pressure supply device 50 is displaced, by a displacement S, out of the initial position 15 thereof into a position 14 by means of the electric motor 1, and therefore a certain volume of pressure medium is displaced out of the pressure chamber 4 via the line 5 and the initially open inlet valve 6 into the wheel brake circuit 8 and, therefore, into the wheel brake 9. Brake pressure is therefore generated in the wheel brake 9 after the friction lining clearance has been bridged.

Brake pressure can be reduced by retracting the piston 3 back in the direction of the rest position 15. A rapid reduction in brake pressure, which is required, for example, in the case of antilock braking control (ABS: antilock braking system), is also possible via the valve combination 6, 7, however, by closing the inlet valve 6 and opening the outlet valve 7 for a certain time. The pressure medium then flows out of the wheel brake 9 via the line 8, through the outlet valve 7 and the line 10, into the pressure medium reservoir 11. This measure of pressure reduction is useful, in particular, when the pressure chamber 4 is connected to a plurality of wheel brakes 9, the brake pressure of which is intended to be controlled individually for the wheel.

In principle, the brake system depicted in FIG. 1 can be expanded to include any number of wheel brakes 9 by routing additional lines 5 to the wheel brake circuits 8, wherein each wheel brake 9 preferably has an individual valve pair consisting of an inlet valve 6 and an outlet valve 7. In order to provide multiple circuits for the brake system, for safety reasons, the pressure supply device can also include two or more pistons 3 and two or more pressure chambers 4. A two-circuit design is useful for a passenger car, wherein two wheel brakes 9 are connected to one of two pressure chambers 4 in each case. Alternative embodiments of the design of the pressure control valves are likewise conceivable.

The exemplary brake system in FIG. 1 advantageously includes a measuring device in the form of a pressure sensor 52 for detecting the (system) pressure $P_{Sys}$ of the pressure supply device 50. The pressure actual value detected by the measuring device 52 is referred to in the following as $P_{Sys,actual}$.

In addition, a measuring device 51 is provided by way of example, by means of which a position of the pressure supply device 50 or the electromechanical actuator is detected, which position is characteristic of a position of the actuator 1 and, therefore, of the piston 3 of the pressure supply device 50. The measuring device 51 can detect, for example, a rotor orientation angle of the electric motor 1 or a spindle position of a rotation-translation gearbox or also the displacement S of the piston 3 out of the rest position 15 thereof. Alternatively, the position of the pressure supply device 50 can also be determined from other variables, for example, on the basis of a model. The corresponding, directly or indirectly determined position of the electromechanical actuator (and, therefore, of the pressure supply device 50) is referred to in the following as $X_{current}$.

For reasons related to safety and rapid fault detection, the measured variable $X_{current}$ and/or the measured variable $P_{Sys}$ are/is advantageously redundantly determined. To this end, the corresponding sensor 51, 52 can be designed to be intrinsically safe or two redundant sensors can be provided.

In addition, the brake system preferably includes an electronic control and regulating unit, to which the actuator position $X_{current}$, the measured pressure actual value $P_{Sys,actual}$, and the pressure setpoint value $P_{Sys,Target}$ are fed and in which a manipulated variable for controlling the actuator 1 is formed.

The need to set a specified system pressure or a (time) system pressure curve $P_{Sys,Target}$ with the aid of a closed-loop response results whenever the driver demands a general brake pressure for the wheel brakes of the motor vehicle by actuating the brake pedal. In addition to the driver's demand, a pressure demand can also be issued by an assistance function (such as, for example, ACC (adaptive cruise control), HSA (hill start assist), HDC (hill descent control), etc.) or when a special braking control function becomes active individually for a wheel, such as, for example, ABS (antilock braking system), TCS (traction control system) or ESP (electronic stability program).

The assistance functions usually demand a global brake pressure for all wheel brakes 9, similarly to the driver with the aid of the general braking initiated with the brake pedal. In these cases, with the inlet valves open 6, the pressure is generated uniformly at all wheel brake circuits 8 by advancing the piston 3.

With respect to the dynamics of the system pressure or the pressure curve to be set, the objective is to provide, within the scope of the available dynamics of the actuator 1, 2, a preferably small time delay between the issued pressure demand $P_{Sys,Target}$ and the developing (system) pressure $P_{Sys,actual}$ in the pressure chamber 4. This also applies, in particular, when the actuator 1, 2 is located in the rest position 15 thereof at the beginning of the pressure demand and therefore must first bridge the friction lining clearance of the wheel brakes 9 in order to set the demanded pressure. In this case, the actuator initially displaces a volume of pressure medium, which is dependent on the size of the wheel brakes 9 used and on the set friction lining clearance, out of the pressure chamber 4 and into the wheel brakes 9 in order to place the friction linings against the brake disk. Brake pressure is not being built up in the wheel brakes 9 during this process, however.

The statements presented above can also be applied to an electromechanical actuator for actuating an electromechanical wheel brake. In an electromechanically actuatable wheel brake, the electromechanical actuator includes, by way of example, an electric motor, a rotation-rotation gearbox, and a rotation-translation gearbox. An actuating element, for example, a piston, is pressed against one of the friction linings by the electromagnetic actuator, and so, after the friction lining clearance is bridged, the friction linings are pressed against the element to be braked, for example, the brake disk, and exert a brake application force F. Instead of the aforementioned (system) pressure $P_{Sys,Target}$ for the pressure supply device of the electrohydraulic brake system, a setpoint force or setpoint brake application force $F_{Target}$ or a (time) setpoint force curve is then specified for each electromechanical wheel brake. In this case as well, the objective is to achieve a preferably small time delay between the issued (brake application) force demand $F_{Target}$ and the developing (brake application) force $F_{actual}$ at the wheel brake. The force actual value $F_{actual}$ of the wheel brake can be measured (e.g., by means of a force sensor) or can also be determined in another manner, for example, on the basis of a model.

The invention therefore relates to a method for controlling an electromechanical actuator of a brake system for motor vehicles, in which an actual value of a controlled variable, for example, a (system) pressure actual value $P_{Sys,actual}$ or a (brake application) force actual value $F_{actual}$, is intended to be set to a specified setpoint value, for example, a (system) pressure setpoint value $P_{Sys,Target}$ or a (brake application) force setpoint value $F_{Target}$.

The invention is explained in greater detail in the following, by way of example, with reference to (system) pressure as the controlled variable. A transfer to (brake application) force, as the controlled variable, is easily possible.

Figure 2:
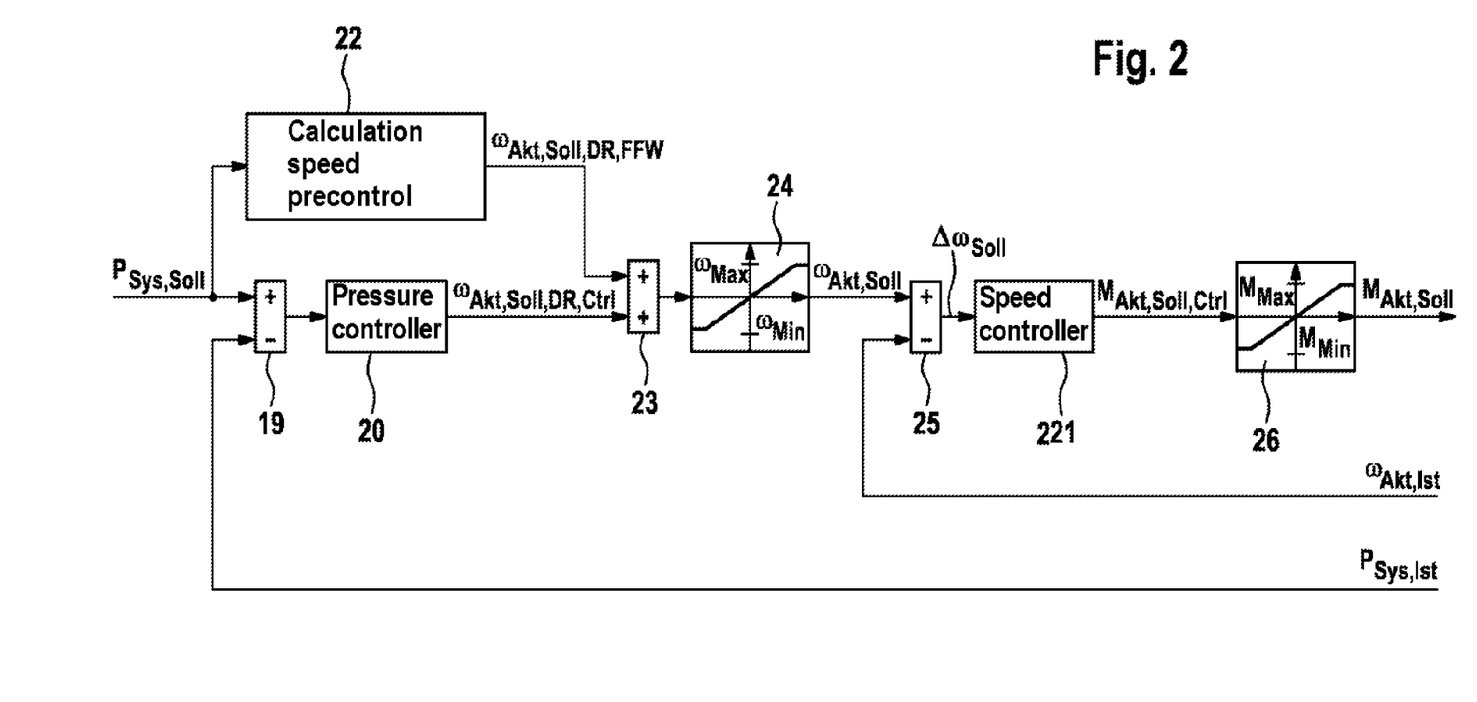
FIG. 2 shows a block diagram of a basic structure of a control device.

FIG. 2 shows a block diagram of a basic structure of a control device, as is known, per se, from DE 10 2012 200 494 A1, and which is suitable for setting a demanded system pressure or pressure curve $P_{Sys,Target}$.

This is a pressure controller 20, downstream of which is an actuator speed controller (speed controller) 21, additional circuit elements 23 to 25 being connected therebetween. In this case, fed to the pressure controller 20 is the result of a subtraction carried out in a comparator 19 or the deviation $\Delta P_{Sys}$ between the demanded pressure setpoint value $P_{Sys,Target}$ and the currently present pressure actual value $P_{Sys,actual}$. The pressure controller 20 controls the deviation $\Delta P_{Sys}$ by specifying a setpoint speed $\omega_{current,Target,DR,Ctrl}$, that is, the output variable of the pressure controller 20 is a first setpoint value $\omega_{current,Target,DR,Ctrl}$ for the actuator speed. The value for the setpoint pressure $P_{Sys,Target}$ is specified by a higher-order open-loop control or closed-loop control (not depicted). The pressure actual value $P_{Sys,actual}$ corresponds to the pressure value generated in the pressure chamber 4 of the pressure supply device 50 shown in FIG. 1. The pressure actual value $P_{Sys,actual}$ is measured, for example, by means of the pressure sensor 52. A proportional-action controller (P controller) is usually sufficient as the controller response characteristic.

A speed precontrol is provided in order to increase the pressure controller dynamics. A speed precontrol calculation module 22 determines an additional component $\omega_{current,Target,DR,FFW}$ (second actuator speed setpoint value) to the setpoint speed of the (pressure) controller $\omega_{current,Target,DR,FFW}$ (first actuator speed setpoint value) from the pressure setpoint value $P_{Sys,Target}$ via differentiation, for example, by means of T a differentiating filter, and by means of weighting with an amplification factor. The sum of the two actuator speed setpoint value components $\omega_{current,Target,DR,FFW}$ and $\omega_{current,Target,DR,Ctrl}$ is formed in the adder 23. This sum is fed to a limiting function 24 in order to be limited to a minimally or maximally permissible setpoint speed ($\omega_{Min}$, $\omega_{Max}$). For example, the maximally permissible setpoint speeds ($\omega_{Min}$, $\omega_{Max}$) can be commensurate in terms of the absolute value thereof.

As a generalization, the components 19, 20, 22, 23 and 24 are also referred to, in short, as a pressure controller or a pressure control device 20.

The output variable is a third setpoint value for the actuator speed (for example, the engine speed) $\omega_{current,Target}$, which is fed to the speed controller 21 as the input variable. A further input variable of the speed controller 21, which usually has proportional-plus-integral (Pi) action, is the actual speed $\omega_{current,actual}$ of the actuator, which is usually determined from the actuator position $X_{current}$, which is available via measurement for purposes of commutation. By way of example, the limited actuator speed setpoint value $\omega_{current,Target}$ is compared with the actuator speed actual value $\omega_{current}$ in a further comparator 25 in order to form an actuator speed setpoint value difference $\Delta \omega_{Target}$. The actuator speed setpoint value difference $\Delta\omega_{Target}$ is fed to the speed controller 21 as an input variable, the output variable of which corresponds to a setpoint value $M_{current,Target,Ctrl}$ of the torque applied by the actuator. Finally, the torque setpoint value $M_{current,Target,Ctrl}$ is limited, in a second limiting module 26, to a minimally or maximally permissible torque value and the result is $M_{current,Target}$ forwarded to the control electronics of the actuator.

In the case of an electromechanical actuator of an electromechanically actuatable brake, in FIG. 2, the (brake application) force F is used instead of the pressure $P_{Sys}$ and the pressure controller 20 is replaced by a corresponding force controller.

Figure 3:
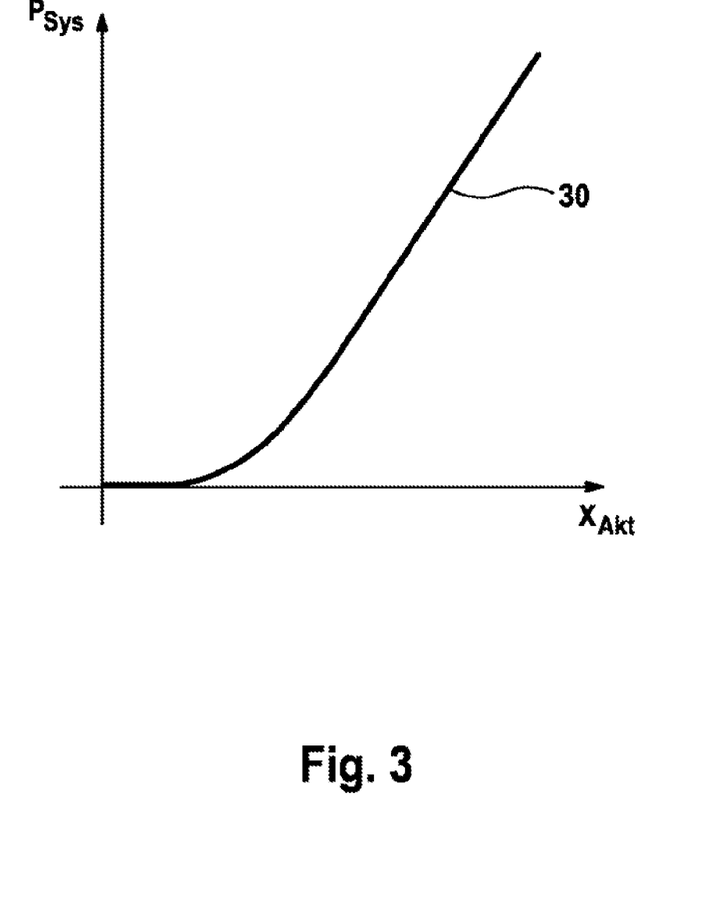
FIG. 3 shows an exemplary relationship between a controlled variable and a position of the electromechanical actuator.

FIG. 3 schematically shows an exemplary relationship between a controlled variable and a position of the electromechanical actuator. The figure depicts an exemplary static characteristic curve 30 for the relationship between the pressure $P_{Sys}$ in the pressure chamber 4 and the actuator position $X_{current}$, which also corresponds to the piston displacement S depicted in FIG. 1. Due to the non-linearity of the characteristic curve 30, the manipulated variables of the pressure controller depicted in FIG. 2 are smaller than is required according to the characteristic curve, in particular in the range of lower pressures or pressure demands up to pressures corresponding to the partial braking range. The speed precontrol 22 shown in FIG. 2, which evaluates the change in the setpoint pressure and injects this as the setpoint speed component, does not account for the fact that a change in the actuator position $X_{current}$, which is substantially greater and, therefore, faster as compared to the higher pressure range, in which the braking characteristic curve shown in FIG. 3 is substantially steeper and approximately linear, is required in order to set a demanded pressure curve in the lower pressure range, that is, in the non-linear portion of the characteristic curve.

This behavior is also significant when relatively great friction lining clearance is set in order to reduce the residual braking torque when the wheel brake is released.

In the case of an electromechanical actuator of an electromechanically actuatable brake, a characteristic curve 40, which corresponds to the characteristic curve 30 and, for example, is non-linear, can be indicated, which characteristic curve 40 describes a relationship between the (brake application) force F and the actuator position $X_{current}$.

In order to eliminate the above-described problem, a method for controlling the electromagnetic actuator is proposed, by way of example, in which a second actuator speed setpoint value is determined for the speed precontrol from the setpoint value of the controlled variable, for example, the pressure setpoint value $P_{Sys,Target}$, by means of a specified relationship between the controlled variable and the actuator position (or a variable corresponding to the actuator position, for example, a pressure medium volume). An actuator position setpoint value $X_{current,Target}$ is advantageously determined from the setpoint value of the controlled variable by means of the specified relationship between the controlled variable and the actuator position (or a variable corresponding to the actuator position), which actuator position setpoint value is then used to determine the manipulated variable for the electromechanical actuator. By way of example, the second actuator speed setpoint value $X_{current,Target}$ is determined from the determined actuator position setpoint value $\omega_{current,Target,DR,FFW,1}$, which is then used for the speed precontrol.

An exemplary controller structure for eliminating the above-described problem is explained with reference to FIG. 4, which shows a section of an exemplary control device.

Figure 4:
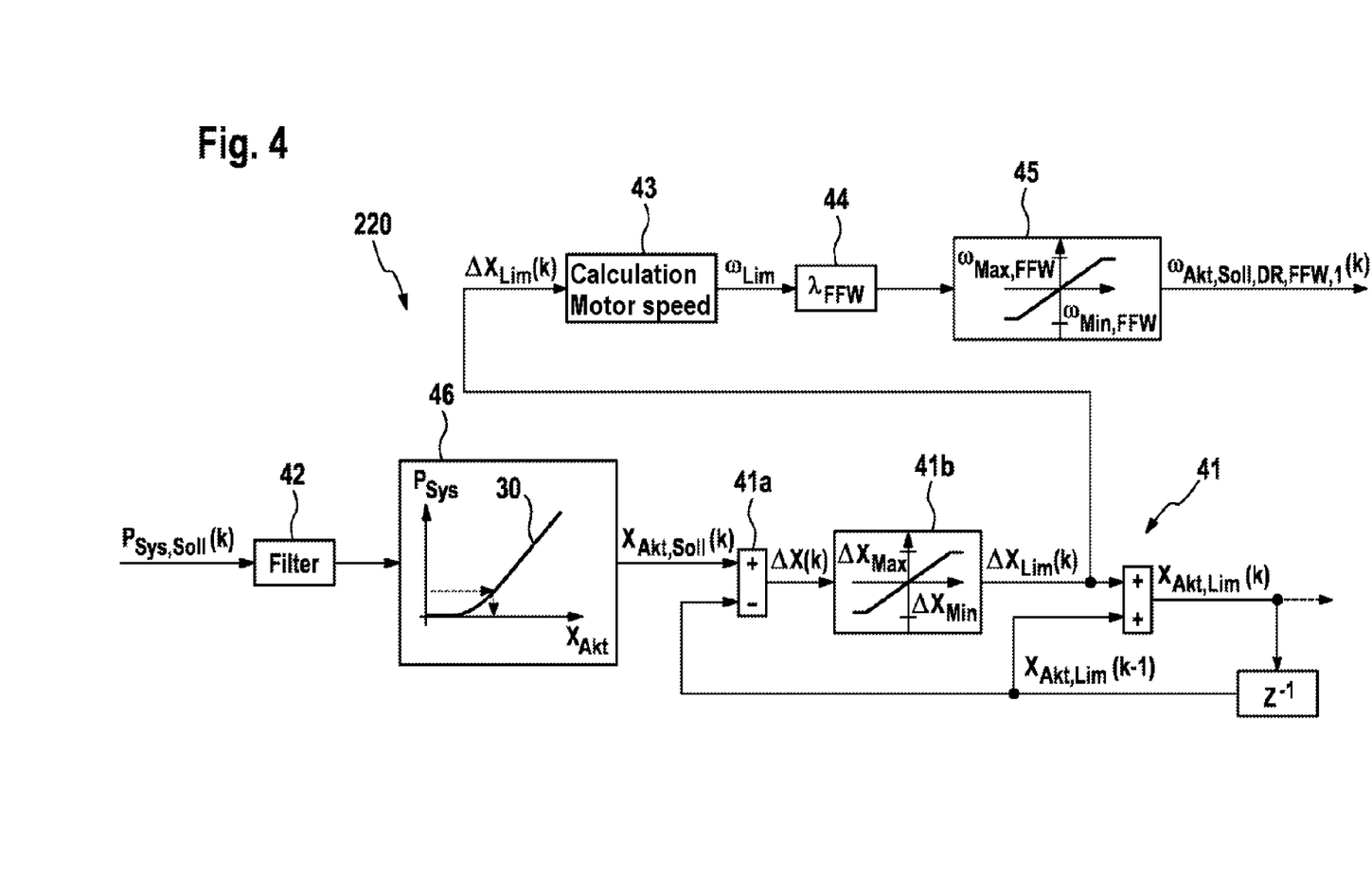
FIG. 4 shows a section of an exemplary control device.

FIG. 4 shows an exemplary function block 220 "calculation of the speed precontrol", which replaces the known function block 22 in FIG. 2. According to the function block 220, the precontrolled actuator speed (that is, the second actuator speed setpoint value) is no longer determined from the setpoint pressure change weighted with a factor (as in block 22), but rather from an actuator position setpoint value $X_{current,Target}$ determined from the pressure setpoint value $P_{Sys,Target}$, in the determination of which the characteristic curve 30 characterizing the brake system is taken into account for the relationship between the pressure $P_{Sys}$ in the pressure chamber 4 and the actuator position $X_{current}$. The precontrolled actuator speed therefore substantially corresponds to the volumetric flow rate required to maintain the setpoint pressure gradient and therefore substantially corresponds to the resultant actuator speed.

The exemplary method or the exemplary control device is based on the fact that, in every loop k of the first controller (pressure controller), a setpoint pressure $P_{Sys,Target}$ (k) demanded for this sampling time is initially converted with the aid of the specified characteristic curve 30 between pressure $P_{Sys}$ and actuator position $X_{current}$ (that is, a function defined by a braking characteristic curve) into a corresponding actuator setpoint position $X_{current,Target}$ (k) (block 46 in FIG. 4). The actuator setpoint position $X_{current,Target}$ (k) is then fed to an increase limitation function.

By way of example, the signal for the demanded setpoint pressures $P_{Sys,Target}$ is low-pass filtered in advance in block 42 in order to minimize interferences in the calculation of the precontrol speed $\omega_{current,Target,DR,FFW,1}$ (that is, of the second actuator speed setpoint value).

The increase limitation function 41 limits the course of the calculated actuator setpoint position $X_{current,Target}$ (k) with consideration for a maximally settable position change $\Delta X_{Max}$ per sampling time of the controller 20 to a value $X_{current,Lim}$ (k). The maximally settable position change $\Delta X_{Max}$ results, for example, from the available actuator dynamics.

Optionally, the limited value $X_{current,Lim}$ (k) can be output (indicated as a dashed line in FIG. 4) and can therefore be used at another point. A use of $X_{current,Lim}$ (k) in the remaining control device in FIG. 2 is not necessary.

By way of example, in the increase limitation function 41, the change $\Delta X$ (k) in the actuator position setpoint value $X_{current,Target}$, which is formed in block 41a from the difference of the actuator position setpoint values of the present time increment k and the previous time increment k−1, is limited in block 41b to a maximum position change ($\Delta X_{Max}$, $\Delta X_{Min}$). The limited change is referred to as $\Delta X_{Lim}$ (k).

The value for the maximum position change $\Delta X_{Max}$ per controller loop is advantageously determined from the value for the minimally or maximally permissible actuator setpoint speed or speed $\omega_{Min}$, $\omega_{Max}$ (see FIG. 2) and, optionally, with consideration for the gearbox 2 of the actuator and the sampling time $T_0$, with which the pressure controller 20 operates.

The value for the change in the actuator setpoint position $\Delta X_{Lim}$ (k) determined within the scope of the increase limitation function 41 is the change in actuator position to be demanded for the present sampling step and is therefore used, by way of example, for calculating the speed precontrol $\omega_{current,Target,DR,FFW,1}$.

In block 43, the actuator speed or the motor speed (so-called first actuator speed) $\omega_{Lim}$ corresponding to the value $\Delta X_{Lim}$ (k) is determined from the determined value for the change in the actuator setpoint position $\Delta X_{Lim}$ (k).

Alternatively (not shown in FIG. 4), the increase-limited actuator position $X_{current,Lim}$ (k) can also be used for calculating the first actuator speed (motor speed) $\omega_{Lim}$, for example, by differentiating the actuator position $X_{current,Lim}$ (k).

By way of example, the speed precontrol is weighted in block 44 by means of a scaling factor $\lambda_{FFW}$, which can assume values, for example, between 0 and 1. This specifies the extent to which the speed precontrol can intervene into the pressure controller 20 or the extent to which the speed precontrol supports the pressure controller in the closed-loop control task thereof. In this case, a scaling factor $\lambda_{FFW}=1$ means the actuator speed injection is carried out by 100%. By way of example, the first actuator speed $\omega_{Lim}$ is multiplied by the scaling factor $\lambda_{FFW}$.

Advantageously, a speed limitation function ($\omega_{Min,FFW}$, $\omega_{Max,FFW}$), which permits a different limitation of the signal for each direction of rotation, is provided in block 45. This means, for example, that the absolute value of $\omega_{Max,FFW}$ can be unequal to the absolute value of $\omega_{Min,FFW}$. As a result, it is possible to permit very high values for the speed precontrol in the case of a demanded pressure build-up, in particular for supporting the rapid bridging of the clearance, whereas smaller maximum values are sufficient for the pressure reduction. By way of example it applies in this case that $$0 < \omega_{Max,FFW} \leq \omega_{Max}$$

and $$\omega_{Min} = -\omega_{Max} \leq \omega_{Min,FFW} < 0.$$

In principle, the speed limitation function of the block 45 ($\omega_{Min,FFW}$, $\omega_{Max,FFW}$) is independent of the speed limitation function of the block 24 ($\omega_{Min}$, $\omega_{Max}$).

By way of example, the actuator speed $\lambda_{FFW}*\omega_{Lim}$ (so-called second actuator speed) multiplied by the scaling factor is speed-limited.

The output variable of the speed limitation function 45 and, therefore, of the exemplary function block "calculation of the speed precontrol" is the second actuator speed setpoint value $\omega_{current,Target,DR,FFW,1}$ (k) (value for the setpoint speed in the precontrol branch of the pressure controller 20), which is superimposed, as the additional component (instead of the signal $\omega_{current,Target,DR,FFW}$ depicted in FIG. 2), on the first actuator speed setpoint value $\omega_{current,Target,DR,Ctrl}$ (setpoint speed of the controller 20).

The exemplary method is robust with respect to parameter fluctuations in the characteristic curve 30, on which the calculations are based and which characterizes the brake system, since demanded pressures are converted into actuator positions, but only the changes in the actuator positions are taken into account for the actual determination of the speed precontrol. An excessive precontrol, which is possible due to parameter changes, can also be avoided by means of a suitable definition/selection of the scaling factor $\lambda_{FFW}$ by eliminating a 100% weighting and choosing a smaller factor instead.

In the case of an electromechanical actuator of an electromechanically actuatable brake, in FIG. 4, the (brake application) force F is used instead of the pressure $P_{Sys}$ and, instead of the pressure-displacement characteristic curve 30 in block 46, a characteristic curve 40 is specified, which describes the relationship between the (brake application) force F and the actuator position $X_{current}$.

The invention offers the advantage of a control concept for the improved setting of specified system pressures/(brake application) forces and for increasing the compliance with the curve in the case of demanded brake pressure curves/(brake application) force curves by means of an electromotively driven actuator in a brake system with consideration for the non-linear behavior of the braking characteristic. Within the scope of the available actuator dynamics, the time delay between the course of the issued pressure/force demand and the developing pressure or the developing (brake application) force is as short as possible.

A further advantage of the invention is that a preferably rapid bridging of the brake friction lining clearance is ensured, and so the time between the issuance of a pressure/force demand and the start of the pressure/force build-up in the wheel brake or wheel brakes, which are acted upon, is preferably short. This is significant, in particular, when the set clearance is relatively great when the wheel brake is released, in order to reduce the residual braking torque.

While the above description constitutes the preferred embodiment of the present invention, it will be appreciated that the invention is susceptible to modification, variation and change without departing from the proper scope and fair meaning of the accompanying claims.

The invention claimed is:

1. A method for controlling an electromechanical actuator of a brake system for motor vehicles, comprising the steps of:
    determining a first actuator speed setpoint value on the basis of a specified setpoint value of a controlled variable and a measured actual value of the controlled variable using a first controller, wherein the controlled variable comprises a system pressure or a brake application force,
    determining a second actuator speed setpoint value on the basis of the specified setpoint value of the controlled variable and a specified relationship between the controlled variable and a position variable corresponding to a position of the electromechanical actuator;
    determining an actuating variable for the electromechanical actuator on the basis of the first actuator speed setpoint value and the second actuator speed setpoint value, and
    controlling the actuator to set the measured actual value of the controlled variable to the setpoint value of the controlled variable
    determining a third actuator speed value by adding together the first and the second actuator speed setpoint value, and the third actuator speed setpoint value is fed, as an input variable, to a second controller.

2. The method as claimed in claim 1 further comprising determining an actuator position setpoint value by a specified relationship between the controlled variable and an actuator position or a variable corresponding to the actuator position.

3. The method as claimed in claim 2, further comprising filtering the actuator position setpoint value and using the filtered actuator position setpoint value for determining the actuator position setpoint value.

4. The method as claimed in claim 2 further comprising determining the second actuator speed setpoint value from the actuator position setpoint value.

5. The method as claimed in claim 2 further comprising carrying out an increase limitation of the determined actuator position setpoint value, by a limitation of a change in actuator position setpoint values that are determined at different sampling times to a maximum position change per one sampling time of the first controller.

6. The method as claimed in claim 5, further comprising determining a limited actuator position setpoint value or a limited change in the actuator position setpoint value in response to carrying out the increase limitation and determining a first actuator speed on the basis of the limited actuator position setpoint value or the limited change in the actuator position setpoint value.

7. The method according to claim 6, further comprising weighing the first actuator speed by multiplication with a scaling factor and defining a weighted first actuator speed.

8. The method as claimed in claim 7 further comprising carrying out a speed limitation of the weighted first actuator speed, wherein, the speed limitation is carried out as a function of a direction of rotation of the actuator.

9. The method as claimed in claim 5 determining the second actuator speed setpoint value on the basis of the limited actuator position setpoint value or the limited change in the actuator position setpoint value or the determined first actuator speed of the second actuator speed setpoint value.

10. A control device for an electromechanical actuator of a brake system for motor vehicles, comprising:
  a first controller to which a specified setpoint value of a controlled variable and a measured actual value of the controlled variable are fed as input variables, and which determines a first actuator speed setpoint value, wherein the controlled variable comprises a system pressure or a brake application force,
  a second controller, connected downstream of the first controller, wherein a third actuator speed setpoint value is determined from the first actuator speed setpoint value and a second actuator speed setpoint value, by addition,
  wherein the second actuator speed setpoint value is determined on the basis of the setpoint value of the controlled variable and a specified relationship between the controlled variable and a position variable corresponding to a position of the electromechanical actuator;
  wherein the control device controls the actuator to set the measured actual value of the controlled variable to the setpoint value of the controlled variable.

11. The control device as claimed in claim 10, further comprising a means for calculating an actuator position setpoint value from the setpoint value of the controlled variable by the specified relationship and for determining the second actuator speed setpoint value from the actuator position setpoint value.

12. The control device as claimed in claim 11, further comprising a means for determining an increase limitation of the determined actuator position setpoint value and defining a limited actuator position setpoint value, and for limiting a change in the actuator position setpoint value to a maximum position change per one sampling time of the first controller and defining a limited change in the actuator position setpoint value.

13. The control device as claimed in claim 12, further comprising a means for calculating a first actuator speed from the limited actuator position setpoint value or from the limited change in the actuator position setpoint value.

14. The control device as claimed in claim 13, further comprising a means for multiplying the first actuator speed with a scaling factor or a means for limiting the first actuator speed.

* * * * *